United States Patent
Vander Berg et al.

(10) Patent No.: US 7,708,252 B2
(45) Date of Patent: May 4, 2010

(54) WALL HANGING SYSTEM

(75) Inventors: Mark Vander Berg, Georgetown, TX (US); Ramon M. Torres, Providence, RI (US); Randall B. Faltesek, Georgetown, TX (US); Ruby M. Schaeffer, Georgetown, TX (US); Gretchen Schafenen, Georgetown, TX (US); Suppawat Kosumsuppamala, Lake Worth, FL (US)

(73) Assignee: Burnes Home Accents, LLC, Austin, TX (US)

( * ) Notice: Subject to any disclaimer, the term of this patent is extended or adjusted under 35 U.S.C. 154(b) by 0 days.

(21) Appl. No.: 10/851,513

(22) Filed: May 21, 2004

(65) Prior Publication Data

US 2005/0109910 A1    May 26, 2005

Related U.S. Application Data

(60) Provisional application No. 60/473,004, filed on May 23, 2003, provisional application No. 60/487,169, filed on Jul. 14, 2003.

(51) Int. Cl.
    *F16M 13/00*    (2006.01)
(52) U.S. Cl. .................................... 248/544; 248/475.1
(58) Field of Classification Search ................. 248/544, 248/547, 546, 475.1, 477, 480, 542, 916; 40/713, 757, 759; 33/371
    See application file for complete search history.

(56) References Cited

U.S. PATENT DOCUMENTS

| 3,294,356 | A |   | 12/1966 | Sherman |
| 3,946,512 | A | * | 3/1976  | Shapiro ........................ 40/759 |
| 3,955,790 | A |   | 5/1976  | Ballin |
| 4,228,982 | A | * | 10/1980 | Sellera ........................ 248/467 |
| 4,530,482 | A | * | 7/1985  | Berinson .................. 248/475.1 |
| 4,611,780 | A | * | 9/1986  | Robertson .................... 248/477 |
| 4,883,247 | A |   | 11/1989 | Crandall |
| 5,103,573 | A | * | 4/1992  | Ehling et al. .................. 33/613 |
| 5,138,134 | A |   | 8/1992  | Ellison |
| 5,209,449 | A |   | 5/1993  | Hart |
| 5,303,895 | A |   | 4/1994  | Hart |

(Continued)

FOREIGN PATENT DOCUMENTS

DE          2 128 940       1/1973

(Continued)

OTHER PUBLICATIONS

International Search Report dated Sep. 15, 2004 for PCT/US2004/016011 (Issued by the European Patent Office, Rijswijk, Netherlands).

(Continued)

*Primary Examiner*—Ramon O Ramirez
(74) *Attorney, Agent, or Firm*—Ropes & Gray LLP

(57) ABSTRACT

A wall hanging assembly including a wall décor item having a generally horizontally oriented receiving surface and a wall mounting rail. The wall mounting rail having an elongate base portion with a back surface adapted to mount adjacent to a wall and a front surface. The wall mounting rail further having a level receptacle on the front surface and a level carried by the receptacle. The wall mounting rail includes a generally horizontally oriented support lip extending along at least part of the wall mounting rail and arranged to bear against the receiving surface of the wall décor item.

6 Claims, 6 Drawing Sheets

U.S. PATENT DOCUMENTS

| | | | |
|---|---|---|---|
| 5,802,729 | A | 9/1998 | O'Brien et al. |
| 5,961,090 | A * | 10/1999 | Parkin ............... 248/475.1 |
| 6,032,378 | A * | 3/2000 | Null ..................... 33/613 |
| 6,283,434 | B1 | 9/2001 | Holder |
| 6,286,802 | B1 * | 9/2001 | Munson et al. ........ 248/475.1 |
| 6,357,716 | B1 * | 3/2002 | Kratish et al. ............ 248/466 |
| 6,629,680 | B2 * | 10/2003 | Weck et al. ............ 248/475.1 |
| 2002/0125389 | A1 | 9/2002 | Chu |
| 2003/0038222 | A1 * | 2/2003 | Holmes ............... 248/475.1 |

FOREIGN PATENT DOCUMENTS

| | | |
|---|---|---|
| DE | G 90 10 963.8 | 12/1990 |
| GB | 1004521 | 9/1965 |

OTHER PUBLICATIONS

Written Opinion dated Sep. 15, 2004 for PCT/US2004/016011 (Issued by the European Patent Office, Rijswijk, Netherlands).

* cited by examiner

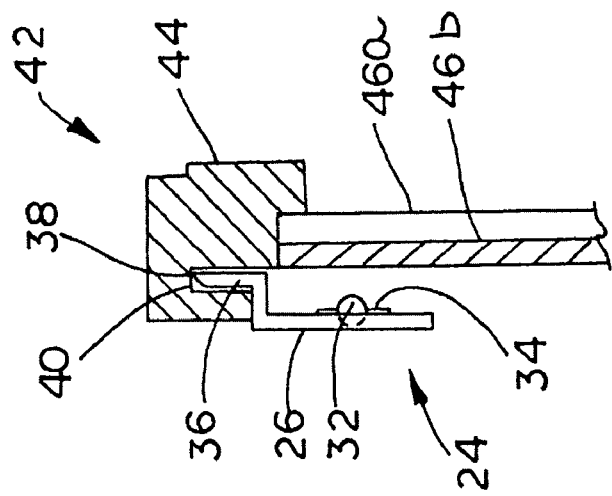
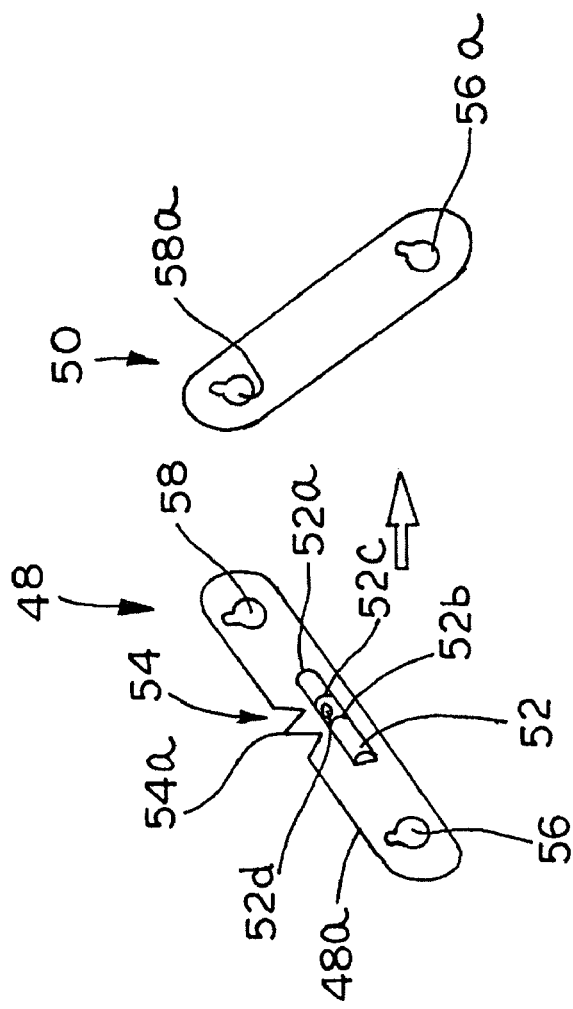
FIG. 2
FIG. 3

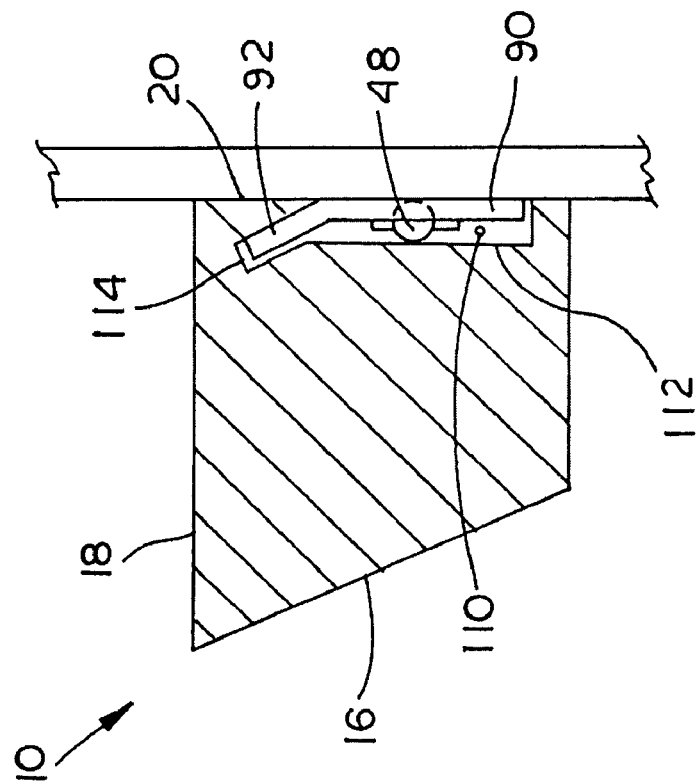
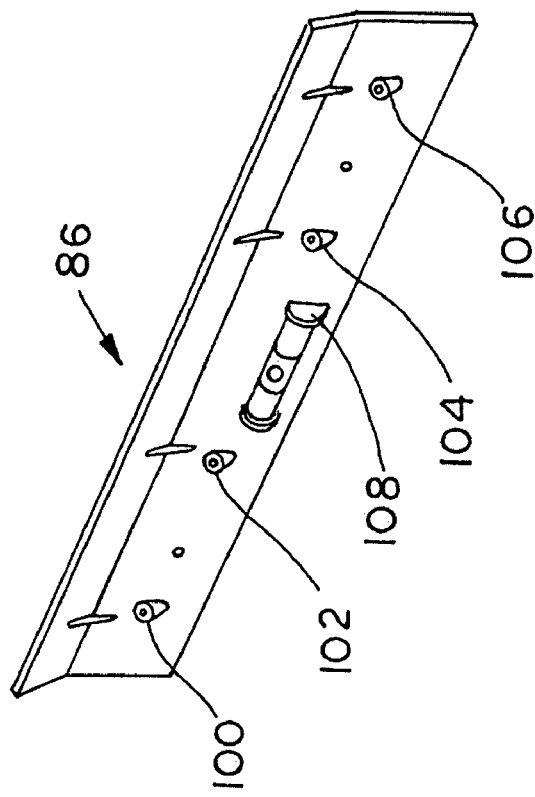

WALL HANGING SYSTEM

CROSS-REFERENCE TO RELATED APPLICATIONS

This patent claims the priority benefit of U.S. Provisional Application No. 60/473,004, filed May 23, 2003, entitled "WALL HANGING SYSTEM"; and U.S. Provisional Application No. 60/487,169, filed Jul. 14, 2003, entitled "WALL HANGING SYSTEM". The disclosures of these two provisional patent applications are hereby incorporated herein by reference in their entirety for all purposes.

TECHNICAL FIELD

This patent generally relates to wall hanging systems, and more particularly to a rail for hanging objects on a wall wherein the rail can be easily leveled and attached to a wall, and the object can be mounted thereon.

BACKGROUND

Known mounting systems are often targeted and marketed to female consumers that dislike the complexity currently involved in hanging and leveling objects on a wall. Observational research has shown that known mounting systems require multiple pieces of equipment such as, for example, hammers, levels, and drills to insure that objects are properly leveled, spaced and secured. Further, in-home consumer research indicates that these mounting systems are considered difficult and complicated to use by the target consumer group.

In an effort to simplify the spacing and alignment of known mounting systems, templates are often used to insure the proper placement of mounting holes and hardware. Templates, while helpful, still require the consumer to utilize a separate level to insure proper orientation and require the use of a drill and wall anchor to affix the mounting hardware. Some known mounting systems require a mating component to be affixed to the item being hung and can cooperate with an additional bracket configured to hold a small spirit level.

BRIEF DESCRIPTION OF THE DRAWINGS

Objects, features, and advantages of the present invention will become apparent upon reading the following description in conjunction with the drawing figures, in which:

FIG. 2 illustrates a side view of the wall mounting bracket of FIG. 2 cooperating with a wall décor item;

FIG. 3 illustrates another embodiment of a wall mounting bracket constructed in accordance with the teachings of the invention;

FIG. 9 illustrates an alternate embodiment of a wall mounting rail constructed in accordance with the teachings of the invention; and FIG. 10 illustrates another example of a wall décor item adapted to receive the wall mounting bracket of FIGS. 8 and 9.

DETAILED DESCRIPTION

Figure 1:
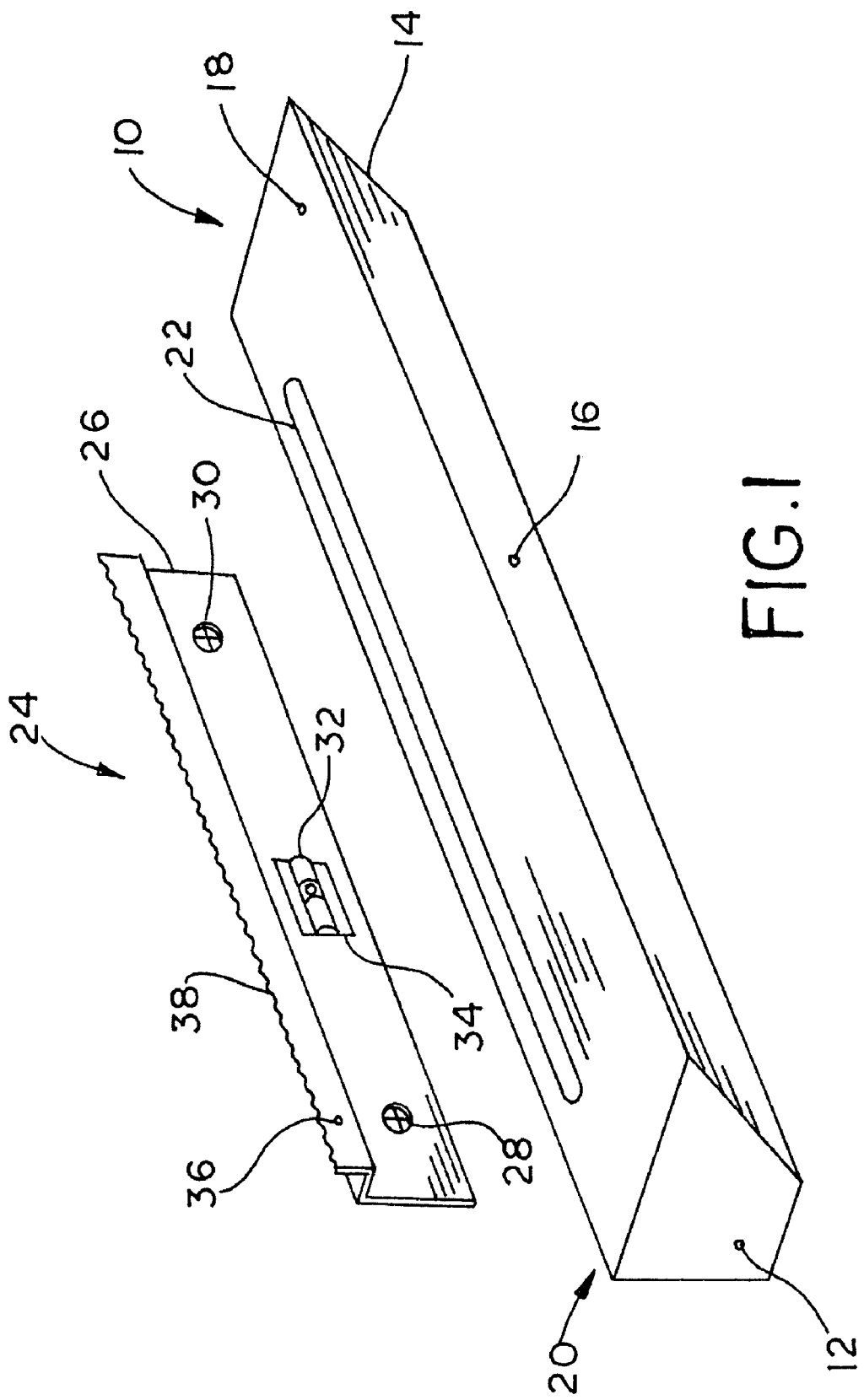
FIG. 1 illustrates an exploded view of one embodiment of a wall décor item and a wall mounting bracket constructed in accordance with the teachings of the invention.

Turning now to the drawings, FIG. 1 illustrates a wall décor item in the form of a ledge 10. The ledge 10 may be a simple rectilinear shelf including a first end 12, a second end 14, a front surface 16, an upward facing presentation or support surface 18, and a rear facing mounting surface 20. The first end 12, second end 14 and front surface 16 may be formed, molded or otherwise manufactured to include or resemble a decorative pattern such as, for example, crown molding, vines and leafs, or other desired features. The presentation surface 18 may include a groove 22 adapted to slideably receive the edge of a picture frame or plate (not shown in FIG. 1) for display on the ledge 10. Moreover, the presentation surface 18 can be textured, knurled and otherwise formed to provide additional surface friction to secure items to be displayed.

FIG. 1 further illustrates an exemplary wall-mounting rail 24 adapted to cooperate with decorative wall décor items such as the ledge 10. The wall-mounting rail 24 includes an elongate planar base 26 adapted to bear against and be affixed flush against a wall surface (not shown). Fasteners such as, for example, nails, screws and anchors, can be installed through first and second mounting holes 28, 30 in the base 26 to secure the wall-mounting rail 24 to a surface. The wall-mounting rail 24 can, alternatively, be secured to the wall using an adhesive such as double-sided tape, epoxy, suitable securing compounds, or other joining methods.

The planar base 26 may include a leveling device or simply a level 32, which can be a mechanical level, a bubble level or any other orientation indicator device. As an alternative, the base can incorporate a plum line and protractor assembly to achieve leveling of the wall-mounting rail 24. The level 32 of the exemplary wall-mounting rail 24 is shown in a horizontal orientation, but may be positioned in any desired orientation depending on the application and/or the angle to be indicated. A mounting receptacle 34 can removably secure the level 32 to the planar base 26. The mounting receptacle 34 may be a separate bracket component affixed to the surface of the planar base 26 as shown, or may be an integral portion formed thereon.

The wall-mounting rail 24 may further include a support ridge or angled lip 36 generally extending away from a planar base 26. In particular, when the wall-mounting rail 22 is positioned adjacent to a wall surface (not shown), the lip 36 extends upwardly and outwardly away from the wall surface. The lip 36 can include a serrated edge 38 to securely grip an edge or groove of the wall décor items to be hung or otherwise secured from the wall-mounting rail 24. Moreover, the lip 36 with or without the serrated edge 38, may be adapted to engage a complimentary receiving slot 40 (see FIG. 2) formed in, for example, a picture frame 42, a shadow box (not shown), the rear mounting surface 20 of the ledge 10, or any other properly configured wall décor item.

FIG. 2 illustrates a side view of the wall-mounting rail 24 shown in FIG. 1 cooperating with another type wall décor item in particular, a suitably configured picture frame assembly 42. The picture frame assembly 42 includes a frame 44 adapted to support an article such as a picture (not shown), a glass plane 46a and a backing 46b. The frame 44 may be a constructed and joined to form any desired shape such as a square or rectangle. The frame 42 may include the receiving slot 40 to engage and cooperate with the lip 36 which, in turn, supports and levels the frame assembly 42 adjacent to the wall.

FIG. 3 illustrates a wall-mounting bracket 48 adapted to engage a receiving bracket 50. The wall-mounting bracket 48 includes an integral bubble level 52 for orientation and alignment. The bubble level 52 will typically include a shatter resistant housing 52a having a pair of indicator marks 52b, 52c defined around the housing midpoint. The shatter resistant housing 52a will typically be substantially filled with a fluid such as water, and the unfilled portion of the shatter resistant housing 52a will define a void or air bubble 52d. The air bubble 52d traverses the length of the shatter resistant housing 52a in opposition to the inclination of the overall indicator. In other words, if the illustrated bubble level 52 is arranged with a clockwise orientation, the air bubble 52d will move in the opposite direction towards (or past) the indicator mark 52b.

The wall-mounting bracket 48 may include a serrated portion 54 formed along a top edge 48a. The serrated portion 54, in turn, can cooperate with an edge of a wall décor item such as a picture frame to secure the item adjacent to the wall. It will be understood that the wall décor item can be configured to receive the serrated portion 54 in the slot 40 or can simply have a flat surface or edge positioned to engage at least one point 54a of the serrated portion 54.

The wall-mounting bracket 48 may further include first and second holes 56, 58 adapted to receive fasteners such as tacks, screws, nails, and wall anchors. The first and second holes 56, 58 may correspond with first and second eyelet holes 56a, 58a formed in the receiving bracket 50. In operation, a pair of fasteners (no shown) may position the wall-mounting bracket 48 adjacent to the wall. The fastener heads may extend beyond the plane defined by the wall and the wall-mounting bracket 48 to engage the first and second eyelet holes 56a, 58a of the receiving bracket 50. In this manner, the receiving bracket 50 may be affixed to a wall décor item to be hung and then secured to the properly leveled wall-mounting bracket 48. The length, diameter, and type of fasteners can vary depending on, among other things, the weight of the wall décor item to be supported by the wall-mounting bracket 48, and the length of the fastener body desired to engage first and second eyelet holes 56a, 58a of the receiving bracket 50.

Figure 5:
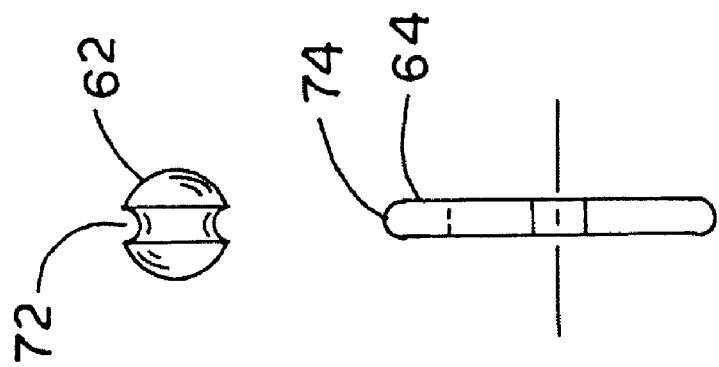
FIG. 5 illustrates a side view of the mechanical level of FIG. 4.
Figure 4:
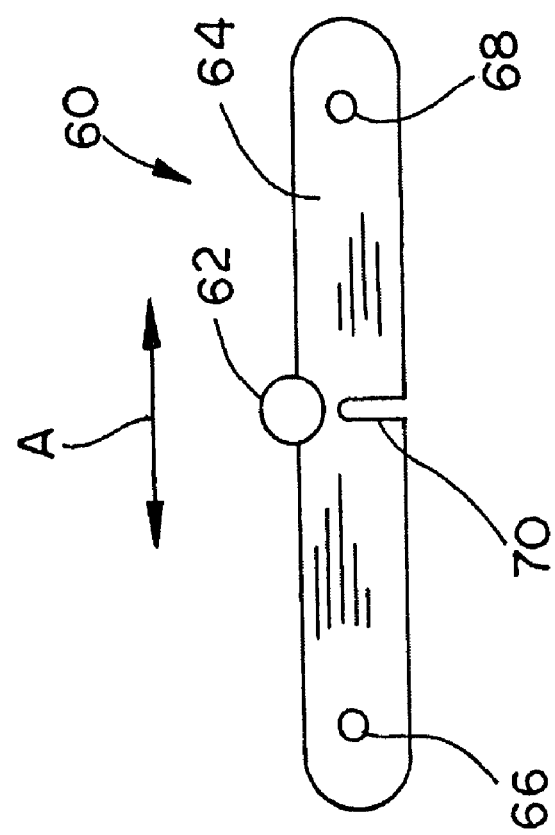
FIG. 4 illustrates a plan view of an embodiment of a mechanical level.

FIGS. 4 and 5 illustrate an alternate leveling device in the form of a mechanical level 60 including a roller 62 and a roller strip 64, which may be formed on, or removably affixed to, the wall-mounting rail 24. The level 60 may include a pair of attachment holes 66, 68 to facilitate attachment to the wall-mounting rail 24. The level 60 can further include an indicator slot 70 which may be an actual slot manufactured along the transverse midline of the roller strip 64, or may simply be a painted line or decal. The roller 62 may generally define a dumbbell or twin lobed cross-section as shown in FIG. 5. The twin lobed cross-section of the roller 62 defines a groove 72 around the circumference between the lobes that allows the roller 62 to translate along a top edge 74 of the roller strip 64. The arrow A, shown in FIG. 4, indicates the lateral translation path of the roller 62 when the level 60 is not in a level orientation.

Figure 7:
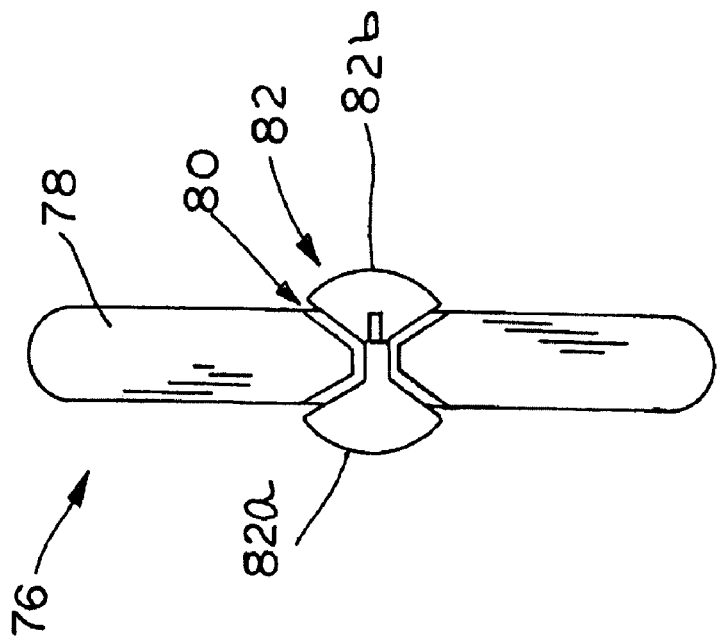
FIG. 7 illustrates a perspective view of the mechanical level of FIG. 6.
Figure 6:
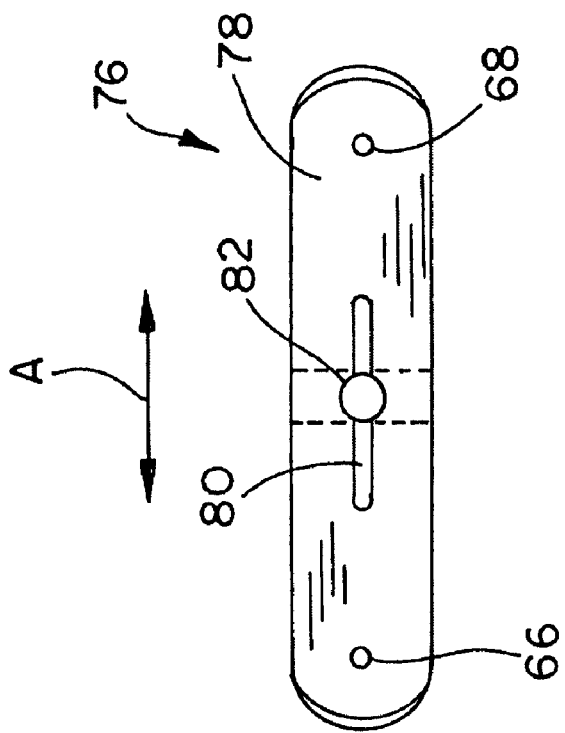
FIG. 6 illustrates a plan view of an another embodiment of a mechanical level.

FIGS. 6 and 7 illustrate an alternate embodiment of a mechanical level 76 including a roller strip 78 having a slot 80 formed along the longitudinal axis. The mechanical level 76 may include a pair of attachment holes 66, 68 to facilitate attachment to the wall-mounting rail 24, or may be an integral part of the planar base 26. The slot 80 cooperates and contains a two-piece roller 82. The two-piece roller 82 may include a male side 82a and a female side 82b, which may be threadably or fixedly attached to each other. In operation, the two-piece roller 82 can translate within the slot 80 in the directions indicated by the arrow A when the level 76 is not in a level orientation.

Figure 8:
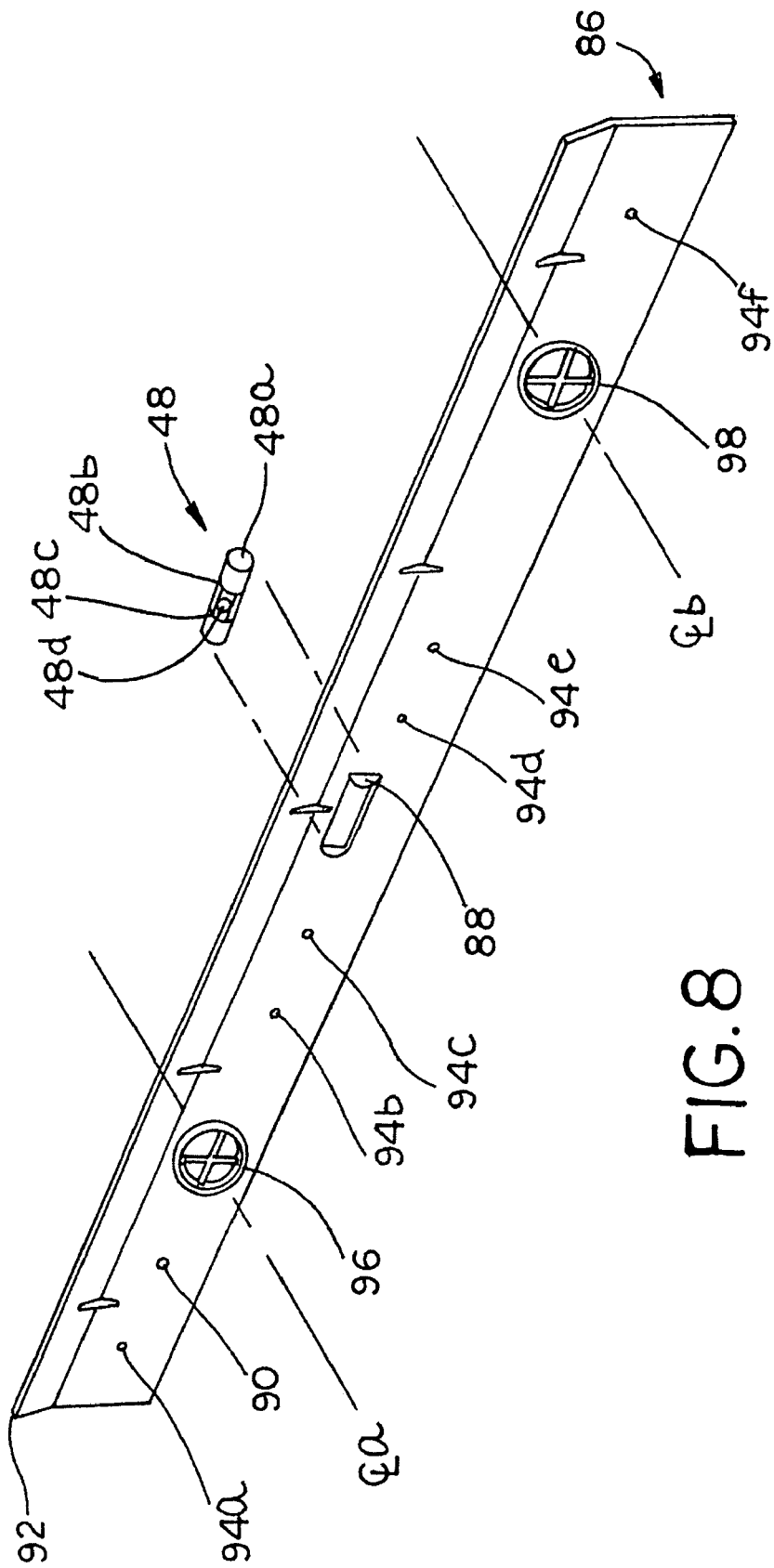
FIG. 8 illustrates another embodiment of a wall mounting rail constructed in accordance with the teachings of the invention.

FIG. 8 illustrates another embodiment of a wall-mounting rail 86 formed to include a mounting receptacle integrally formed therein. The mounting receptacle is a snap-in holder 88 sized to accept a tubular spirit level such as the bubble level 48 (see FIG. 4). The wall-mounting rail 86 includes a substantially flat back portion 90 and an angled lip portion 92. In operation, the substantially flat back portion 90 may be positioned adjacent to a planar wall surface such that the angled lip 92 extends upwardly and outwardly away from both the back portion 90 and the wall surface. The wall-mounting rail 86 may be manufactured from a polycarbonate material or any other suitable material such as melamine, which is a thermosetting plastic. Melamine is strong, lightweight, and resistant to acids, alkalis, and most food stains.

During the installation process, the wall-mounting rail 86, and more specifically the flat back portion 90, is typically positioned flush against the planar surface of the wall. The flat back portion 90 includes the snap-in holder 88 and the bubble level 48 removably secured therein. It will be understood that the bubble level 48 may be an integral component of the wall-mounting rail 86, or may be replaced, for example, with any of the mechanical levels shown in FIGS. 4-7. The bubble level 48 indicates the misalignment or canted orientation of the wall-mounting rail 86 as the difference in relative positions between the air bubble 48d and the indicator marks 48b, 48c, as described earlier in connection with FIG. 3.

The wall-mounting rail 86 can be secured to a wall when the air bubble 48d is positioned between the indicator marks 48b, 48c (i.e., when the wall-mounting rail 86 is level.) The wall-mounting rail 86 may temporarily be affixed to the wall using adhesive, brads and short nails to insure the overall orientation is maintained. The brads, short nails etc. may be driven through positioning holes 94a-94f in order to temporarily secure the wall-mounting rail 86 in the proper orientation. Alignment aids 96, 98 formed in the flat back portion 90 may provide guides for permanently securing and positioning the wall-mounting rail 86. The alignment aids 96, 98 can be positioned or spaced apart at regular intervals, such as 16 in. or 24 in. on-center (i.e., the spacing between $CL_a$ and $CL_b$ is equal to the standard spacing for wall support studs). In this way, fasteners received through the alignment aids 96, 98 can cooperate with wall studs to fixedly attach the wall-mounting rail 86 to the surface of the wall.

FIG. 9 illustrates the wall-mounting rail 86 including alternate alignment aids 100, 102, 104 and 106. The alignment aids 100, 102, 104 and 106 may be angled to guide a fastener (e.g., a brad or a nail) into the surface of the wall at an oblique angle. In this manner, the angle of each fastener can be assured to oppose the force of the load placed on the lip 92, thereby providing the wall-mounting rail 86 with additional strength and load-bearing capability. In addition, an alternate mounting receptacle in the form of a snap-in holder 108 can allow access to the bubble level 48 (see FIGS. 3 and 8) from the front of the wall-mounting rail 86. Front access to the bubble level 48 allows a single level to be used with multiple hanging rails which, in turn, could reduce the number of components and the cost associated with a mounting rail assembly product. As shown in FIG. 9, the bubble level 48 may be vertically off-centered with respect to the wall-mounting rail 86.

FIG. 10 illustrates the previously described ledge 10 slideably secured to the wall-mounting rail 86. The ledge 10 includes a receiving groove 110 adapted to accept the wall-mounting rail 86 when the two components are laterally engaged. It will be understood that the receiving groove 110 may alternatively be constructed to vertically accept the lip 36 of the wall-mounting rail 24. The receiving groove 110 includes an elongate portion 112 sized to accept the flat back portion 90, and an angled channel 114 sized to accept the lip 92. Thus, the ledge 10 engages the wall-mounting rail 86, which will typically be securely fastened to the surface of the wall, while maintaining the ability to laterally translate along a path defined by the angled channel 114 and the lip 92. Because the ledge 10 and the wall-mounting rail 86 are laterally slideable relative to each other, the final position of the ledge 10 may be laterally adjusted. Thus, the wall-mounting rail 86 including the bubble level 48 allows the consumer to easily mount and level the wall bracket. Further, when wall mounting adhesive tape is employed to mount the wall-mounting rail 86, the process can be done totally without the need of tools.

While the wall-mounting rails (and bracket) 24, 48 and 86 has been described herein cooperating with a ledge 10 and a picture frame 42, any number of wall décor items such as, a shadow box, a decorative figurine case, a picture frame, a book shelf, a hat or coat rack, etc. may be employed using the teaching disclosed herein. It will further be understood that the overall size of the wall-mounting rails (and bracket) 24, 48 and 86 may be varied depending on the load and application for which it will be employed. In particular, if the wall-mounting rail is to be used in an industrial environment, then a heavy gauge steel and industrial fastener may be employed to allow significant loads to be supported.

Although certain wall hanging systems and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

The invention claimed is:

1. A wall mounting rail in combination with a wall item, wherein the wall mounting rail is adapted to support the wall item, the wall mounting rail comprising:
   a substantially flat back portion adapted to be positioned adjacent to a wall;
   a pair of opposite ends;
   a level arranged to indicate the relative inclination of the pair of opposed ends;
   at least two alignment aids formed through the substantially flat back portion, wherein each of the at least two alignment aids is angled to guide a fastener into the surface of the wall at an oblique angle;
   at least two positioning holes formed through the substantially flat back portion, wherein the at least two positioning holes are sized to accept temporary fasteners and are arranged to allow for adjustment of the relative inclination of the pair of opposed ends; and
   a support ridge spaced forward from the substantially flat back portion and having an upturned portion extending generally upward, wherein the support ridge includes an angled portion arranged to extend outward between a top edge of the substantially flat back portion and the upturned portion, when the substantially flat back portion is aligned parallel to the wall; and
   the wall item comprising a receiving groove formed therein, wherein the receiving groove comprises an elongated portion sized to accept the substantially flat back portion of the wall mounting rail and an angled channel sized to accept the support ridge of the wall mounting rail, and wherein the elongated portion is shaped such that it is substantially flush with the substantially flat back portion of the wall mounting rail.

2. The wall mounting rail of claim 1, wherein each of the two alignment aids is sized to accept a permanent fastener.

3. The wall mounting rail of claim 1, wherein each of the two alignment aids is arranged to maintain the relative inclination of the pair of opposite ends upon accepting the permanent fasteners.

4. The wall mounting rail of claim 1, wherein the angled channel comprises two opposing surfaces that are substantially parallel to each other.

5. The wall mounting rail of claim 1, wherein the angled channel laterally engages the support ridge.

6. The wall mounting rail of claim 1, wherein the angled channel is shaped such that it is substantially flush with the support ridge.

* * * * *